United States Patent
DeSota

(10) Patent No.: US 7,337,352 B2
(45) Date of Patent: *Feb. 26, 2008

(54) CACHE ENTRY ERROR-CONNECTING CODE (ECC) BASED AT LEAST ON CACHE ENTRY DATA AND MEMORY ADDRESS

(75) Inventor: Donald R. DeSota, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,333

(22) Filed: Aug. 13, 2005

(65) Prior Publication Data

US 2005/0273669 A1   Dec. 8, 2005

Related U.S. Application Data

(63) Continuation of application No. 09/683,931, filed on Mar. 4, 2002, now Pat. No. 6,971,041.

(51) Int. Cl.
*G06F 11/00* (2006.01)

(52) U.S. Cl. .............................. 714/6; 714/768; 714/805

(58) Field of Classification Search ................... None
See application file for complete search history.

(56) References Cited

U.S. PATENT DOCUMENTS

| | | | |
|---|---|---|---|
| 5,345,582 A * | 9/1994 | Tsuchiya | 714/53 |
| 5,455,834 A * | 10/1995 | Chang et al. | 714/768 |
| 5,666,513 A * | 9/1997 | Whittaker | 711/118 |
| 6,038,693 A * | 3/2000 | Zhang | 714/768 |
| 6,226,763 B1 * | 5/2001 | Fu et al. | 714/53 |
| 6,772,383 B1 * | 8/2004 | Quach et al. | 714/746 |
| 2002/0124143 A1 * | 9/2002 | Barroso et al. | 711/145 |
| 2003/0084369 A1 * | 5/2003 | Kane et al. | 714/5 |

OTHER PUBLICATIONS

Computer Glossary, 1995-2001, ESC Technologies, ECC memory definition.*

* cited by examiner

*Primary Examiner*—Marc Duncan
(74) *Attorney, Agent, or Firm*—Abdy Raissinia

(57) ABSTRACT

Determining an error-correcting code (ECC) for a cache entry based at least on the data stored in the cache entry and the memory address at which the data is permanently stored is disclosed. A cache entry for a desired memory address is retrieved. The cache entry includes data and a stored ECC based on the data and a memory address. An ECC is determined based at least on the data of the cache entry and the desired memory address. If the ECC at least based on the cache entry data and the desired memory address equals the stored ECC, then the cache entry caches the desired memory address without error.

17 Claims, 5 Drawing Sheets

CACHE ENTRY ERROR-CONNECTING CODE (ECC) BASED AT LEAST ON CACHE ENTRY DATA AND MEMORY ADDRESS

RELATED APPLICATIONS

The present patent application is a continuing patent application of, and claims priority under 35 USC 120, to the presently patent application filed on Mar. 4, 2002, and assigned Ser. No. 09/683,931 now U.S. Pat. No. 6,971,041.

BACKGROUND OF THE INVENTION

1. Technical Field

This invention relates generally to a cache for remote or primary memory, and more particularly to determining whether a cache entry in the cache actually caches a desired memory address of the remote or primary memory.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to thirty-two or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems. The term building block is used herein in a general manner, and encompasses a separable grouping of processor(s), other hardware, such as memory, and software that can communicate with other building blocks.

Many multi-processor systems, as well as single-processor systems, employ a cache to improve performance. For instance, in a NUMA multi-processor system, each building block may have a cache to temporarily store data permanently stored on the remote shared memories of other building blocks. Types of caches include one-way, or direct-mapped, caches, in which each memory address can be cached at only a given location in the cache, as well as the more general multi- or n-way caches, in which each memory address can be cached at n different locations in the cache. When a processor wishes to access the data stored at a given memory address, the processor or another component determines whether the cache currently stores this data. If so, then there is no need to access the data at its remote or otherwise primary memory.

The data in a cache is normally managed in fixed sized blocks, typically between 32 and 128 bytes long. With 32-byte blocks, the low five bits of the address ($2^5$=32) determine which byte within a block is desired. The remaining bits of an address are called the block address. The block address is further split into an index portion and a tag portion. The index portion, which is typically the low-order portion of the block address, determines where the block can be held in the cache. The tag portion, typically the high order portion of the block address, is used to identify which block actually is stored at a given cache location. The number of bits used as the tag determines how many different memory addresses can be cached in the same location in the cache. As a simple example, for a four-bit memory address having the three trailing bits 111, the leading bit can be either 0 or 1. If the tag is only this first leading bit, this means that for the cache location corresponding to the bits 111, either the memory address 0111 or the memory address 1111 can be stored. To ensure that using a cache improves performance, the process of determining whether the cache holds the data for the desired memory address should be performed quickly. One way to accomplish this is to use a fast tag lookup operation.

A fast tag lookup operation determines whether a desired tag is stored at a given location in the cache. In some systems, a cache controller passes a request for performing this operation to another component in the system, while concurrently or immediately thereafter reading the cache. This other component should perform the fast tag lookup operation and its results should be received by the controller before or at the same time the controller completes its cache read operation. In this way, the controller knows whether the cache stores the desired memory address before or at the same time the data from the cache is retrieved. If the fast tag lookup operation is not performed quickly enough, the controller will have already retrieved the cache entry for the memory address, and will have to wait to learn whether the cache entry actually caches the memory address.

To ensure that the fast tag lookup operation is performed fast enough, the memory that the fast tag lookup operation uses must be sufficiently fast, typically faster than the memory being used as the cache. However, such fast memory can be expensive. To decrease costs, system designers may limit cache size to so that the size of the memory used for the fast tag lookup can also be limited. However, decreasing cache size usually leads to performance degradation of the system. Therefore, system designers may have to choose between performance and cost in developing their systems. For these described reasons, as well as other reasons, there is a need for the present invention.

SUMMARY OF THE INVENTION

The invention relates to determining an error-correcting code (ECC) for a cache entry based at least on the data stored in the cache entry and the memory address at which the data is permanently stored. A method of the invention first retrieves a cache entry for a desired memory address. The cache entry includes data and a stored ECC based at least on the data and a memory address. An ECC is determined based at least on the data of the cache entry and the desired memory address. If the ECC based at least on the cache entry data and the desired memory address equals the stored ECC, then the method concludes that the cache entry caches the desired memory address without error.

A system of the invention includes a primary memory, a cache, and a controller. The primary memory has a number of memory entries corresponding to memory addresses. Each memory entry has data and a primary ECC based on only the data. The cache has a number of cache entries less than the number of memory entries. Each cache entry has data and a stored ECC based at least on the data and a memory address to which the cache entry corresponds. The controller, to retrieve desired memory addresses, determines whether the cache entries for the desired memory addresses actually cache them. This is accomplished by determining ECCs based at least on the data of the cache entries and the desired memory addresses, and then comparing the ECCs determined to the stored ECCs of the cache entries.

An article of manufacture of the invention includes a computer-readable medium and means in the medium. The means is for determining whether a cache entry for a desired memory address caches the desired memory address without error. This is accomplished by determining an ECC based at least on data stored in the cache entry and the desired memory address, and comparing the ECC to a stored ECC of the cache entry. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
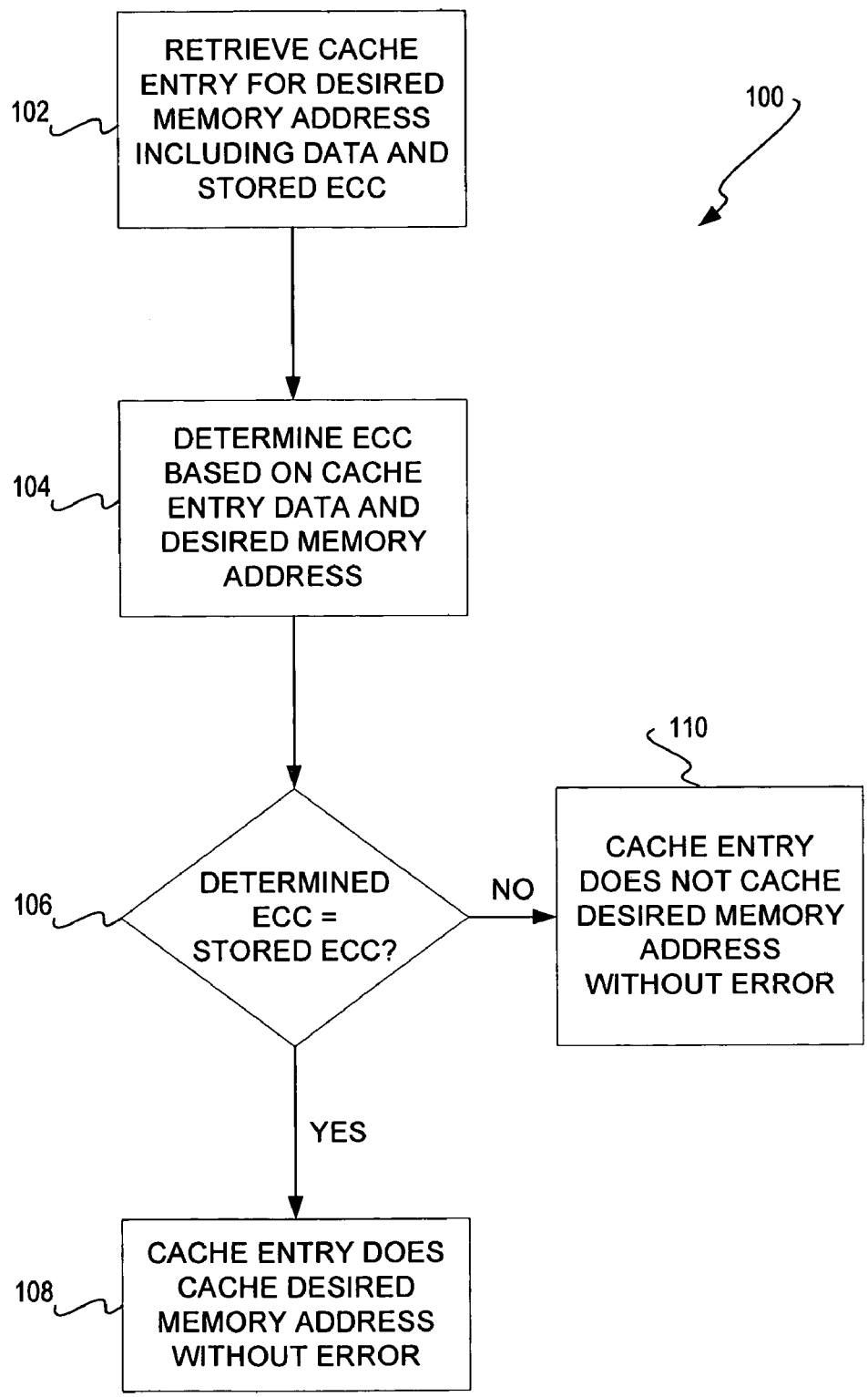
FIG. 1 is a flowchart of a method according to a preferred embodiment of the invention, and is suggested for printing on the first page of the patent.

FIG. 1 shows a method 100 according to a preferred embodiment of the invention. Parts of the method 100 may be implemented as means within a computer-readable medium of an article of manufacture. The computer-readable medium may be a recordable data storage medium, such as a floppy disk, a CD-ROM, a hard disk drive, and so on, as well as a modulated carrier signal. Furthermore, the method 100 may also include other steps and/or acts, but only those steps and/or acts that preferably illustrate performance of the method 100 are explicitly depicted in FIG. 1.

A cache entry for a desired memory address is retrieved (102). The desired memory address is with respect to a remote or a primary memory that a cache can cache in the cache entry. However, because the cache entry is also responsible for caching other memory addresses, besides the desired memory address, the method 100 determines whether the cache entry is currently actually caching the desired memory address. The cache entry includes the data of a memory address that is being cached, and a stored error-correcting code (ECC).

An ECC, which may also stand for error-correction code, is a generated checksum, which, as an example only, for a 32-bit word may typically add seven bits to the word. These bits of correcting code are determined for every 32 bits of data placed in memory. An ECC may also be generated by algorithms other than a simple checksum, and can be implemented in conjunction with words of lengths other than 32 bits, such as 64-bit and 128-bit words. When data is retrieved from the memory, the checksum is recomputed to determine if any of the data bits have been corrupted. In the case of the stored ECC of the cache entry, the stored ECC is based both on the data of the cache entry, as well as on the memory address that is being cached by the cache entry. That is, the stored ECC is not based only the data of the cache entry, but also the memory address that is currently being cached, such as all or part of the memory address, the tag of the memory address, and so on.

Next, an ECC is determined based on the data of the cache entry and the desired memory address (104). The ECC is said to be based on the data and the desired memory address in that it can be based on the data and all bits of the desired memory address, the data and some bits of the desired memory address, the data and a tag of the desired memory address, and so on. If the determined ECC equals the stored ECC (106), then this means that the cache entry caches the desired memory address without error (108). If the determined ECC does not equal the stored ECC (106), then this means that the cache entry does not cache the desired memory address without error (110). That is, where the determined ECC equals the stored ECC, since the determined ECC is based on the cache entry data and the desired memory address, this means that the stored ECC is also based on the cache entry data and the desired memory address. Because the stored ECC is also based on the memory address of the data being cached by the cache entry, this means that the cache entry caches the desired memory address.

However, the determined ECC not equaling the stored ECC can result from two different situations occurring. First, the memory address being cached by the cache entry may not be the desired memory address. Since the determined ECC is based on the cache entry data and the desired memory address, and the stored ECC is based on the cache entry and the memory address being cached by the cache entry, the determining ECC being different than the stored ECC may mean that the memory address being cached by the cache entry is not the desired memory address.

Second, the memory address being cached by the cache entry may actually be the desired memory address, but the cache entry does not cache the desired memory address without error. That is, such a difference between the determined ECC and the stored ECC can result from the more standard usage of ECCs, namely, detecting data errors. In this instance, the data of the desired memory address is in fact cached by the cache entry, but the cache entry did not correctly store this data, such that the data as stored in the cache entry has an error.

Technical Background

Figure 2:
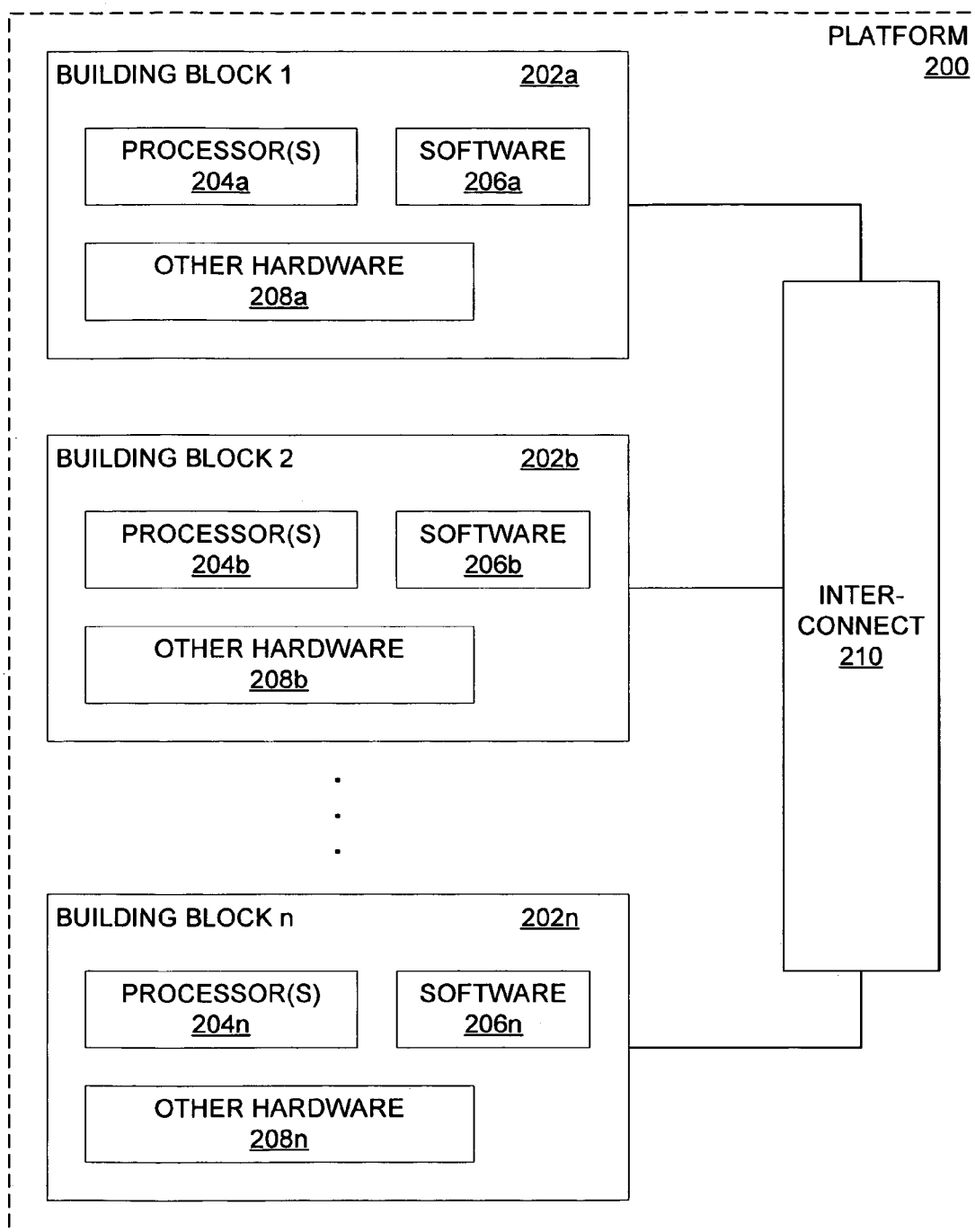
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202a, 202b, . . . 202n, that are connected to one another via an interconnect 210. Each example building block has one or more processors, software, as well as other hardware, such as memory. For instance, the building block 202a has processor(s) 204a, software 206a, and other hardware 208a, whereas the building block 202b has processor(s) 204b, software 206b, and other hardware 208b. The building block 202n has processor(s) 204n, software 206n, and other hardware 208n. A building block can be non-restrictively defined as a grouping of at least one or more processors and memory, although the invention is not so limited.

The platform 200 itself can be a non-uniform memory access (NUMA) system, such as a cache-coherent (CC-NUMA) system, a NUMA-quad (NUMA-Q) system, and so on. Where the platform 200 is a NUMA-Q system, each example building block is a quad, or quad building block (QBB), having up to four processors, local memory, and input/output (I/O) hardware. The interconnect 210 may be a link, such as an IQ-link or a CC-link. The invention can also be implemented in conjunction with other systems, such as symmetric multi-processor (SMP) systems, and so on. The term platform as used herein is synonymous with the term system.

Figure 3:
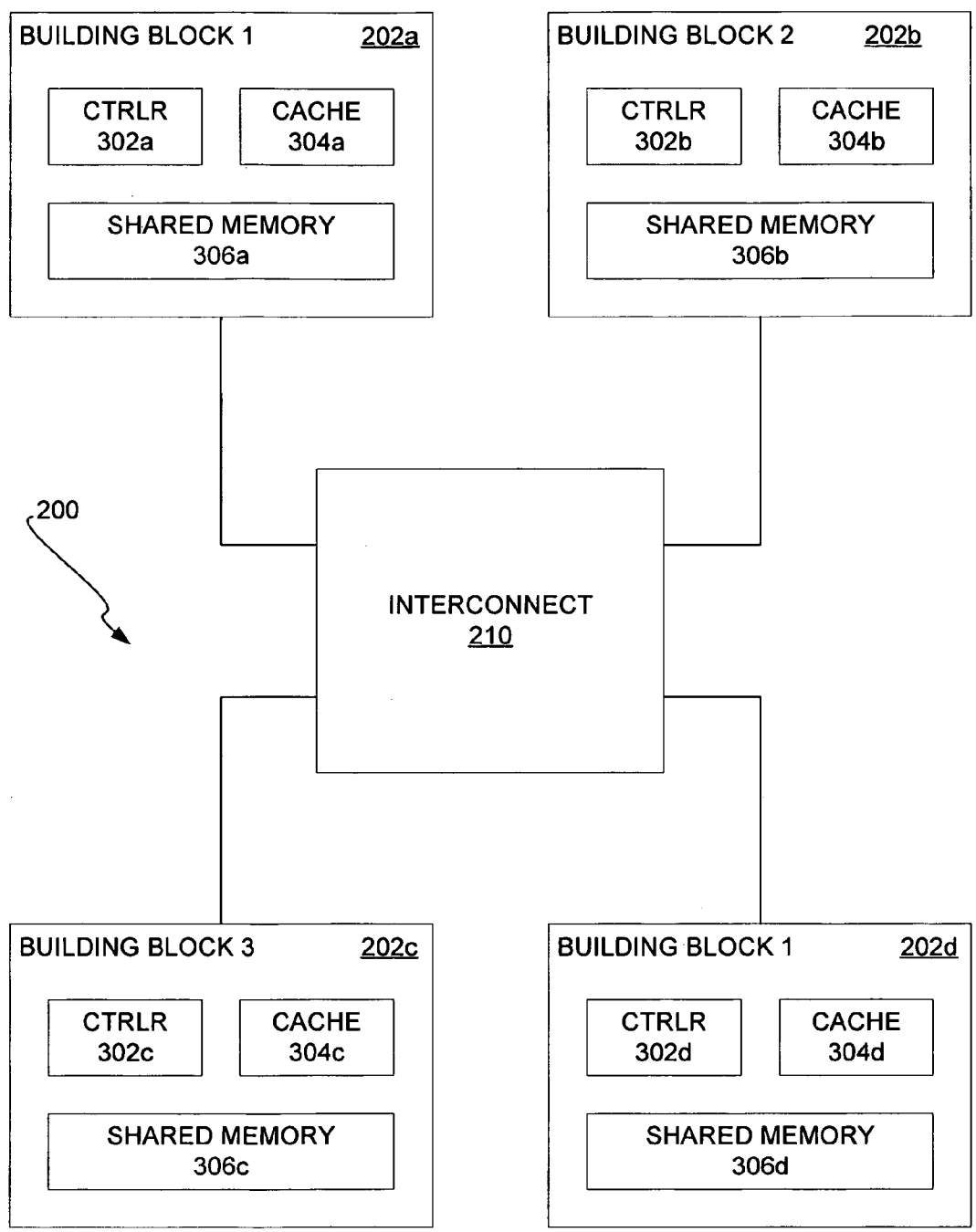
FIG. 3 is another diagram of the example platform of FIG. 2, in which different components of the building blocks and the interconnect are illustrated, and in accordance with which embodiments of the invention may be practiced.

FIG. 3 shows another view of the platform 200 of FIG. 2, specifically the case where there are four building blocks 202a, 202b, 202c, and 202d, connected to an interconnect 210. Each building block has a controller, a cache, and shared memory. That is, the building blocks 202a, 202b, 202c, and 202d have controllers 302a, 302b, 302c, and 302d, respectively, caches 304a, 304b, 304c, and 304d, respectively, and shared memories 306a, 306b, 306c, and 306d, respectively. For descriptive convenience, the term building block 202 refers to any of the building blocks 202a, 202b, 202c, and 202d. Similarly, the term controller 302 refers to any of the controllers 302a, 302b, 302c, and 302d, and the term cache 304 refers to any of the caches 304a, 304b, 304c, and 304d. Likewise, the term shared memory 306 refers to any of the shared memories 306a, 306b, 306c, and 306d.

The controller 302 is a processor or an I/O object, component, or other module that can determine whether a desired memory address is cached in the cache 304, in accordance with methods of various embodiments of the invention as described in other sections of the detailed description. The controller 302 may be a special-purpose application-specific integrated circuit (ASIC). The shared memory 306 is the memory of the building block 202 that is shared with all the other building blocks preferably as a single memory map. That is, a single memory map encompasses all the shared memories 306a, 306b, 306c, and 306d, such that an address within the memory map refers to only one shared memory 306. The shared memories 306a, 306b, 306c, and 306d constitute primary memory, in distinction to cache memory.

The local or remote cache 304 is meant to temporarily store the data for a limited number of memory addresses of the shared memories. The cache 304 may be a one-way cache or a multi- or n-way cache. The cache 304 has a number of cache entries less than the number of memory entries of the sum of the shared memories 306a, 306b, 306c, and 306d. Each cache entry has data and a stored error-correcting code (ECC), the latter which is based on the data stored in the cache entry and the memory address to which the data corresponds. Likewise, the shared memories 306a, 306b, 306c, and 306d preferably have for each of its memory addresses a memory entry that includes data and an ECC referred to as a primary ECC. The primary ECC is based on the data stored by the memory entry.

One-Way Cache Embodiment

Figure 4:
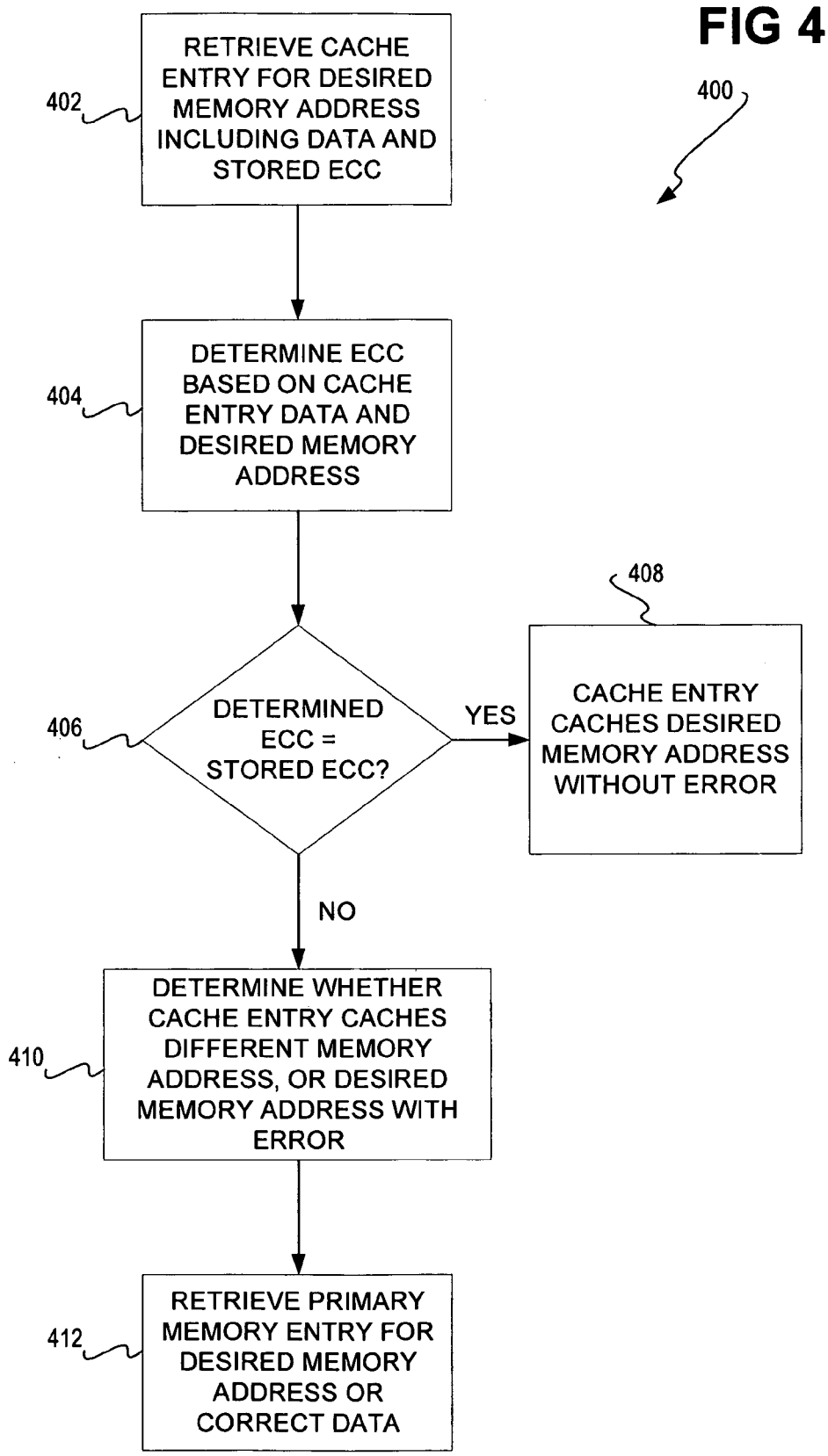
FIG. 4 is a flowchart of a method for performance in conjunction with a one-way cache, according to an embodiment of the invention.

FIG. 4 shows a method 400 for performance in conjunction with a one-way cache, according to an embodiment of the invention. As has been indicated, in a one-way cache, a memory address within a primary or shared memory can be cached in the cache in only one cache location. Thus, for a memory address having bits n:0, the lower bits b:0 may indicate a location within a cache block, bits x:b+1 may indicate where in the cache the memory address is to be cached, such that the higher bits n:x+1 are the tag. Where there are y such higher bits, each cache entry can cache any of $2^y$ different memory addresses. The error-correcting codes (ECCs) in this embodiment of the invention are generally based on data and a memory address, and more particularly are based on the data and the tag—the y higher bits n:x+1—of the memory address.

The method 400 first retrieves a cache entry for a desired memory address (402). The cache entry includes the data stored in the cache entry for a given memory address, which may not necessarily be the desired memory address, and a stored ECC. The stored ECC is based on the data and the given memory address to which the data relates. Next, the method 400 determines an ECC based on the cache entry data and the desired memory address (404). If the determined ECC equals the stored ECC (406), then this means that the cache entry caches the desired memory address without error (408), such that the data of the cache entry is the data stored in a memory entry within the primary memory at the desired memory address.

If, however, the determined ECC does not equal the stored ECC (406); then the method 400 optionally determines either whether the cache entry caches a different memory address other than the desired memory address, or whether the cache entry does in fact cache the desired memory address but with error (410). In either case a slow tag storage is examined to determine which case is, in fact, true. If the tag bits retrieved from the slow tag store match the tag bits of the desired address, then a data error has occurred, and can be corrected as is known within the prior art. If the tag bits retrieved from the slow tag store do not match the tag bits of the desired address, then normal cache miss processing can cause the correct data to be fetched from the primary memory store for the desired address. Ultimately, then, the method 400 retrieves the desired memory address from the primary memory or corrects the data retrieved from the cache (412).

Multi-Way Cache Embodiment

Figure 5:
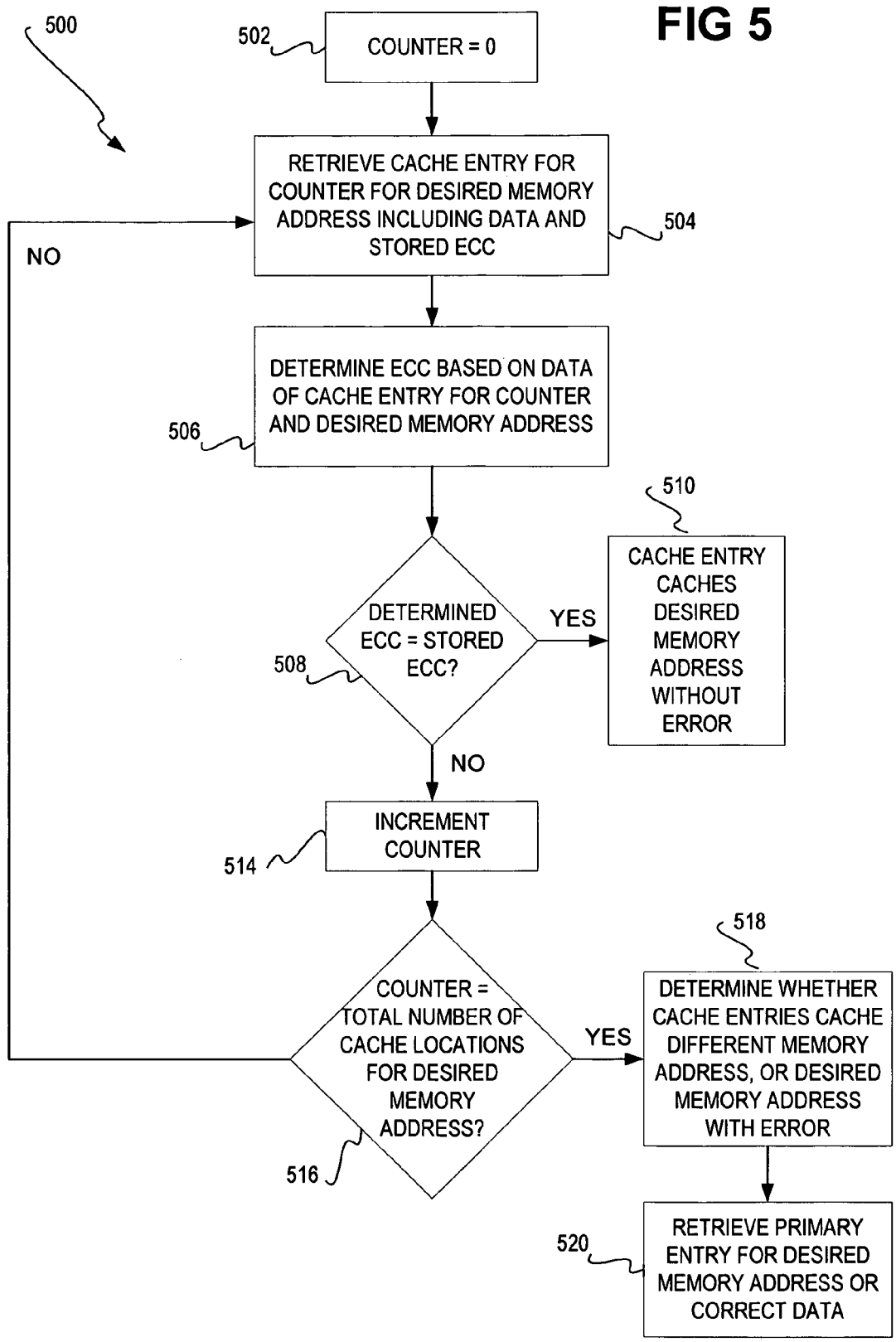
FIG. 5 is a flowchart of a method for performance in conjunction with an n-way cache, according to an embodiment of the invention.

FIG. 5 shows a method 500 for performance in conjunction with a multi- or n-way cache, according to an embodiment of the invention. As has been indicated, in an n-way cache, a memory address within a primary or shared memory can be cached in the cache in more than one location of the cache. Thus, for a memory address having bits n:0, the lower bits x:b+1 may only partially indicate where in the cache the memory address is to be cached.

One or more other bits may be added to the front end of these lower bits for complete indication as to where in the cache the memory address can be cached. Because the one or more other bits can have different values, and where there are z such bits, each memory address can be cached in $2^z$ different cache entries. For instance, if there are two such additional bits, and there are three lower bits x:0 of the memory address equal to 111, the memory address can be cached in the cache entry indicated by 00111, 01111, 10111, and 11111, for a total of $2^{z=2}=4$ such cache entries.

The higher bits n:x+1 of the memory address still indicate the tag of the memory address. Where there are y such higher bits, each cache entry can cache any of $2^y$ different memory addresses. The error-correcting codes (ECCs) in this embodiment are generally based on data and a memory address, and more particularly are based on the data and the tag—the y higher bits n:x+1—of the memory address.

The method 500 sets a counter to zero (502). The counter specifies which of the cache entries that can possibly be caching the desired memory address is to be examined. Next, the cache entry indicated by the current value of the counter is retrieved (504). The first time 504 is performed, in other words, the first cache entry that can possibly be caching the desired memory address is retrieved. The cache entry includes data for a given memory address, which may not necessarily be the desired memory address, and a stored ECC that is based on the data and the given memory address.

An ECC based on the data of this cache entry and the desired memory address is determined (506). If the determined ECC is equal to the stored ECC (508), then this means that the current cache entry caches the desired memory address without error (510). The data of the cache entry is the data stored in a memory entry within the primary memory at the desired memory address. The method 500 is then finished.

However, if the determined ECC does not equal the stored ECC (508), then the counter is incremented by one (514). If the counter is not equal to the total number of locations in the cache—that is, the total number of cache entries—that can possibly cache the desired memory address (516), then there are more cache entries to investigate. The method 500 proceeds back to 504 to retrieve another cache entry for the desired memory address, as has been described.

However, if the counter is equal to the total number of cache entries that can possibly cache the desired memory address (516), then there are no more cache entries to investigate, such that no cache entry for the desired memory address caches the desired memory address without error. The method 500 therefore optionally determines either whether all of the cache entries cache a different memory address other than the desired address, or whether one of the cache entries does in fact cache the desired memory address but with error (518). In either case a slow tag storage is examined to determine which case is, in fact, true. If the tag bits retrieved from the slow tag store match the tag bits of the desired address, then a data error has occurred, and can be corrected as is known within the prior art. If the tag bits retrieved from the slow tag store do not match the tag bits of the desired address, then normal cache miss processing can cause the correct data to be fetched from the primary memory store for the desired address. Ultimately, then, the method 500 retrieves the desired memory address from the primary memory or corrects the data retrieved from the cache (520).

Alternative Embodiment: Encoding Cache State in ECC

Embodiments of the invention have been described as generating an ECC based on the data stored in a cache entry as well as the memory address to which the data relates. Alternatively, cache state may also be encoded in the ECC, in addition to the data store in the cache entry and the memory address to which the data relates. Furthermore, the memory that stores the tag of the memory address can store the cache state. There are typically four cache states: invalid, shared, modified, and exclusive.

An invalid state specifies that a given memory address is not stored in the cache. A shared state indicates that a copy of the data at the memory address is stored in the cache, and may be stored in another cache as well. The value of the data stored in these caches is identical to that stored at the memory address. A modified state indicates that only the cache in question caches the memory address, and that the value of the data has been modified as stored in the cache as compared to the value of the data as stored at the memory address. An exclusive state indicates that only the cache in question caches the memory address, but that the value of the data has not been modified as stored in the cache as compared to the value of the data as stored at the memory address.

Based on the cache state, a processor may or may not be able to read or write a cache entry from the cache. Generally, a processor is allowed to read data from the cache only if the state is modified, shared, or exclusive as to the memory address in question. The processor is allowed to write data to the cache generally only if the state is modified or exclusive as to the memory address in question.

Advantages over the Prior Art

Embodiments of the invention allow for advantages over the prior art. By encoding the memory address, such as the tag thereof, being cached in the error-correcting code (ECC) of a cache entry, embodiments of the invention do not require the fast tag lookup operations of the prior art. That is, a cache entry retrieved by a controller itself provides the necessary information for the processor to determine whether the cache entry caches a desired memory address. The controller does not have to retrieve the cache entry and perform or request to be performed a fast tag lookup operation to determine whether the entry caches the desired memory address. This means that the fast memory that may be needed for the fast tag lookup operation in the prior art can be replaced by slower, less expensive memory. Since fast memory is generally more expensive than other types of memory, system designers can lower the costs of their systems, or develop systems at the same cost but which have a greater amount of cache to increase performance.

Other Alternative Embodiments

It will be appreciated that, although specific embodiments of the invention have been described herein for purposes of illustration, various modifications may be made without departing from the spirit and scope of the invention. Whereas the invention has been substantially described in relation to a multi-processor system, it can also be implemented in conjunction with a single-processor system. For instance, the shared memories within a multi-processor system may constitute primary memory that is cached by the cache. However, within a single-processor system, there otherwise is still primary memory that is cached by the cache. Accordingly, the scope of protection of this invention is limited only by the following claims and their equivalents.

I claim:

1. A method comprising:

retrieving a cache entry for a desired memory address, the desired memory address being one of a number of different memory addresses of a memory that the cache entry can cache, the memory being other than a cache of which the cache entry is a part, the cache entry including data and a stored error-correcting code (ECC) based at least on the data and a memory address, the memory address being one of the number of different memory addresses that the cache entry can cache, the cache entry currently caching the memory address;

determining an ECC based on at least the data of the cache entry and the desired memory address; and, upon determining that the ECC based at least on the data of the cache entry and the desired memory address equals the stored ECC, concluding that the cache entry caches the desired memory address without error.

2. The method of claim 1, further comprising, otherwise, retrieving a primary memory entry for the desired memory address.

3. The method of claim 1, further comprising determining whether the cache entry caches the desired memory address with error.

4. The method of claim 1, further comprising determining whether the cache entry caches a memory address other than the desired memory address.

5. The method of claim 1, wherein determining the ECC comprises determining the ECC based on the data of the cache entry and a tag of the desired memory address.

6. The method of claim 1, wherein determining the ECC based on at least the data of the cache entry and the desired memory address comprises determining the ECC also based on a state of the cache as to the cache entry.

7. A system comprising:

a primary memory having a number of memory entries corresponding to a plurality of memory addresses, each memory entry having data and a primary error-correcting code (ECC) based on the data;

a cache having a number of cache entries less than the number of memory entries, each cache entry having data and a stored ECC based at least on the data and a memory address to which the cache entry corresponds and that the cache entry currently caches, the memory address being one of a number of different memory addresses of the primary memory that the cache entry can cache, the cache being a memory other than the primary memory; and, a controller to retrieve desired memory addresses, the controller determining whether the cache entries for the desired memory addresses cache the desired memory addresses by determining ECCs based at least on the data of the cache entries and the desired memory addresses and comparing the ECCs determined to the stored ECCs of the cache entries each desired memory address being one of a number of different memory addresses of the primary memory that a corresponding cache entry can cache.

8. The system of claim 7, wherein the cache comprises a one-way cache, such that each memory entry of the primary memory can be cached in only one of the number of cache entries.

9. The system of claim 7, wherein the cache comprises a multi-way cache, such that each memory entry of the primary memory can be cached in more than one of the number of cache entries.

10. The system of claim 7, wherein the controller, for each desired memory address, retrieves the memory entry for the desired memory address from the primary memory upon concluding that the ECC determined for the desired memory address does not equal the stored ECC for the cache entry for the desired memory address.

11. The system of claim 7, wherein each of the stored ECC and the ECC determined is based on at least the data and a tag of the memory address.

12. The system of claim 7, wherein each of the stored ECC and the ECC determined is also based on a cache state.

13. The system of claim 7, wherein the system comprises a plurality of processors, such that the system is a multi-processor system.

14. The system of claim 7, wherein the system comprises a single processor, such that the system is a single-processor system.

15. An article comprising:

a tangible computer-readable medium; and, means in the medium for determining whether a cache entry for a desired memory address caches the desired memory address without error by determining an error-correcting code (ECC) based on at least data stored in the cache entry and the desired memory address and comparing the ECC to a stored ECC of the cache entry, wherein the desired memory address is one of a number of different memory addresses of a memory that the cache entry can cache, and the memory is other than a cache of which the cache entry is a part, where the stored ECC of the cache entry is based at least on one of the number of different memory addresses that the cache entry is currently caching.

16. The article of claim 15, wherein the means determines the ECC also based on a state of the cache entry.

17. The article of claim 15, wherein the medium is a recordable data storage medium.

* * * * *